(12) United States Patent
Cariaga Crespo et al.

(10) Patent No.: US 9,231,394 B2
(45) Date of Patent: Jan. 5, 2016

(54) CEMENTITIOUS FIBRE REINFORCED COMPOSITE CROSS ARM

(75) Inventors: Juan Ignacio Cariaga Crespo, Calgary (CA); Adelana R. Gilpin-Jackson, Port Coquitlam (CA); Janos Csaba Toth, Vancouver (CA)

(73) Assignees: BRITISH COLUMBIA HYDRO AND POWER AUTHORITY, Vancouver, British Columbia (CA); LAFARGE CANADA INC., Pointe-Claire, Quebec (CA)

( * ) Notice: Subject to any disclaimer, the term of this patent is extended or adjusted under 35 U.S.C. 154(b) by 35 days.

(21) Appl. No.: 13/531,448

(22) Filed: Jun. 22, 2012
(Under 37 CFR 1.47)

(65) Prior Publication Data
US 2014/0158418 A1 Jun. 12, 2014

Related U.S. Application Data

(63) Continuation-in-part of application No. 12/636,632, filed on Dec. 11, 2009, now abandoned.

(51) Int. Cl.
*E04H 12/24* (2006.01)
*H02G 7/05* (2006.01)
*H02G 7/20* (2006.01)

(52) U.S. Cl.
CPC ..................................... *H02G 7/05* (2013.01)

(58) Field of Classification Search
CPC ............. H02F 7/05; H02G 7/20; E04H 12/24
USPC .................................... 174/45 R, 40 R, 149 R
See application file for complete search history.

(56) References Cited

U.S. PATENT DOCUMENTS

| | | | | |
|---|---|---|---|---|
| 868,591 | A * | 10/1907 | Yaxley | 52/697 |
| 2,721,362 | A * | 10/1955 | McCoy et al. | 174/43 |
| 3,653,622 | A * | 4/1972 | Farmer | 211/107 |
| 4,314,434 | A * | 2/1982 | Meisberger | 52/651.02 |
| 4,407,601 | A * | 10/1983 | Reeder | 403/25 |
| 4,596,105 | A * | 6/1986 | Farmer | 52/697 |
| 4,798,362 | A * | 1/1989 | Troutner | 248/62 |
| 4,932,623 | A * | 6/1990 | Reisdorff | 248/219.3 |
| 6,478,867 | B1 * | 11/2002 | Cheyrezy et al. | 106/644 |
| 6,609,345 | B2 * | 8/2003 | Schauf et al. | 52/309.7 |
| 6,860,935 | B2 * | 3/2005 | Rossi | 106/644 |
| 7,419,543 | B2 * | 9/2008 | Destree | 106/640 |
| 2009/0319235 | A1 * | 12/2009 | Lin et al. | 703/1 |

* cited by examiner

*Primary Examiner* — Sherman Ng
(74) *Attorney, Agent, or Firm* — Nixon Peabody LLP; Khaled Shami

(57) ABSTRACT

A cross arm is provided, for use in a support structure for conductors within an electrical grid. The cross arm is made of a cementitious composite and has a rough "C" cross sectional shape. Pairs of the cross arms are attached to utility poles in a parallel position on opposite sides of the utility pole. Alternatively, a single cross arm may be attached to a utility pole. Embedded metal or glass fiber reinforced polymer bars extend along the length of the cross arms.

11 Claims, 14 Drawing Sheets

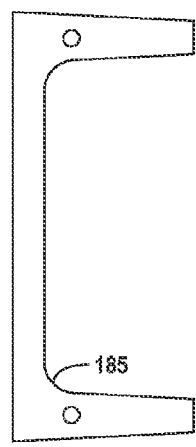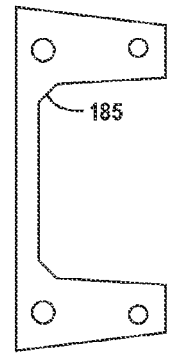
FIG. 11A　　　　　　　　　　FIG. 11B
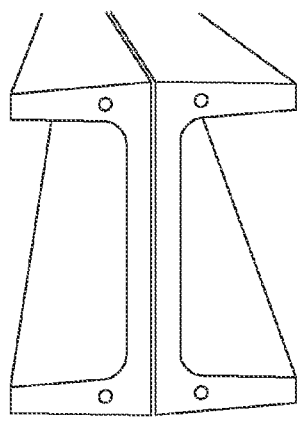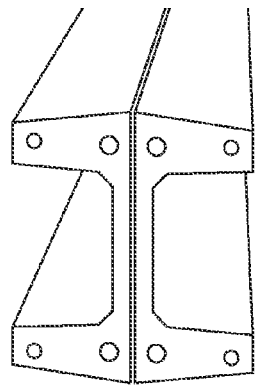
FIG. 11C　　　　　　　　　　FIG. 11D

CEMENTITIOUS FIBRE REINFORCED COMPOSITE CROSS ARM

CROSS REFERENCE TO RELATED APPLICATIONS

The present application is a continuation-in-part of U.S. patent application Ser. No. 12/636,632, filed on Dec. 11, 2009, the entire disclosure which is incorporated herein in full by reference.

FIELD OF THE INVENTION

The present invention relates to the field of cross arms in the electrical utility industry.

BACKGROUND OF THE INVENTION

Cross arms are used throughout the world as structural elements to support electrical power transmission lines above the ground. These transmission cross arms, normally between 6 to 14 m in length, can be made of a variety of materials, the most common of which is timber.

The service life of cross arms is a very important factor. Given the difficulties of reaching and replacing the cross arms (which may be in very remote locations), the cost of replacing a cross arm exceeds that of the cost of the cross arm, itself.

The use of timber cross arms, as shown in FIGS. 1 and 2, poses certain challenges. Good quality timber for use in the cross arm is becoming increasing difficult to obtain given diminishing old growth forests which is the prime timber source, as well as the impact of modern environmental laws.

Timber cross arms also have a limited life span (typically about 25 years) and decay naturally. Moreover, it can be difficult to detect cracks in timber through visual inspection. Also the moistness and/or temperature of the ambient surroundings of the timber may hide or exaggerate such cracks.

Timber cross are combustible and propagate fire rapidly in forest fires; they are attractive to woodpeckers; and, under certain weather conditions, they can initiate a pole top fire. Timber cross arms also creep (e.g. deflect) under heavy loads sustained for long periods of time.

There have been several attempts to overcome these difficulties by substituting timber with other materials. Despite these attempts, timber remains the primary source of cross arms in the power transmission industry.

Metal, particularly galvanized steel, cross arms have been used. The primary disadvantage of using a metal cross arm is its electrical conductivity, which makes the cross arm very dangerous for transmission line technicians (or linemen) to work with on energized live lines. The galvanized coating of such cross arms has a life expectancy of about 25 years, after which the cross arm is susceptible to corrosion. For these reasons, metal cross arms are not widely used.

Laminated timber has also been used for cross arms, wherein the timber has been coated with a protective coating to prevent moisture penetration to increase the life expectancy of the cross arm. Some coatings are environmentally unfriendly, and may leach into the surrounding environment. Moisture and cracks may cause delamination of the timber. Under many circumstances, such cross arms may have a lower life expectancy than untreated timber.

Fibre reinforced polymer has also been used to make cross arms. These have a glass fibre interior coated with a polymer matrix. Such cross arms lack fire resistance and suffer from delamination if not protected from ultraviolet light.

Concrete, while commonly used as a building material, has not proven suitable for use as a cross arm. Concrete has large capillarity porosity, which allows water to penetrate and can cause the concrete to crack in freezing and thawing cycles. Unreinforced concrete will crack under tension stress. Regular concrete without reinforcement is quite brittle, and lacks ductility, which is a problem when used as a long cross arm. Given the different load conditions in electrical transmission lines (load due to the weight of conductors, insulators, radial ice on conductors, wind on conductors) the cross arm requires ductility, i.e. the ability of the material to plastically deform while continuing to carry loads without fracture, even after micro cracking. Also, concrete is not easily usable with thin sections of a cross arm. A cross arm made of concrete would be large, bulky, heavy and would require steel reinforcement for structural bending capacity and stirrups for shear reinforcement. For the above reasons concrete has not been used for cross arms across the transmission industry.

SUMMARY OF THE INVENTION

The present invention provides a cross arm, comprising:
a) a back member having a top edge and a bottom edge;
b) a top member extending from said top edge;
c) a bottom member extending from said bottom edge;
wherein said cross arm is composed of a cementitious composite and wherein such members and cementitious composite composition allow the arm to support vertical, transverse and longitudinal loads.

The present invention further provides a cross arm comprising a back member having a top edge and a bottom edge; a top extension extending from the top edge; a bottom extension extending from said bottom edge; and wherein the cross arm is composed of a cementitious composite. The top extension and bottom extension extend generally perpendicular to the back member, which has a generally flat back portion. The cross arm may include a number of metal or glass reinforced polymer bars running positioned on the longitudinal axis along the cross arm within the cross arm. The cross arm is attachable to a utility pole opposite a second cross arm, and supports a conductor.

A support structure for a conductor is provided, including an utility pole; a first cross arm composed of a cementitious composite, attached to the utility pole; a second cross arm composed of the cementitious composite, attached to the utility pole, on the opposite side of the pole, parallel to the first cross arm, wherein the conductor is supported between the first and second cross arm. The first and second cross arms are attached to the utility pole by a threaded rod passing between the cross arms and the utility pole. An insulator, supported by a hardware member, holds the conductor.

The present invention provides cross arms which offer significant advantages over wood and steel counterparts. They are strong, durable, virtually maintenance free, flexible in dimension and installation (single pole or H-frame), cost efficient, electrically resistive, light weight, easy to transport and are sustainable. Further advantages include: predictable and consistent performance, better insulating value than wood, better resistance to lightening impulses, no uv degradation, no partial discharge, safer live-line maintenance, freeze/thaw and corrosion resistance, high resistance to tracking damage, and high resistance to damage from flashovers. Equally important, from a usability perspective, these arms may be installed using the same hardware, erection methods and equipment/tools as current timber or steel cross arms.

DESCRIPTION OF THE FIGURES

FIGS. 11A, 11B, 11C and 11D illustrate a preferred arm optimization, wherein flange size is increased;

DESCRIPTION OF THE INVENTION

Figure 1:
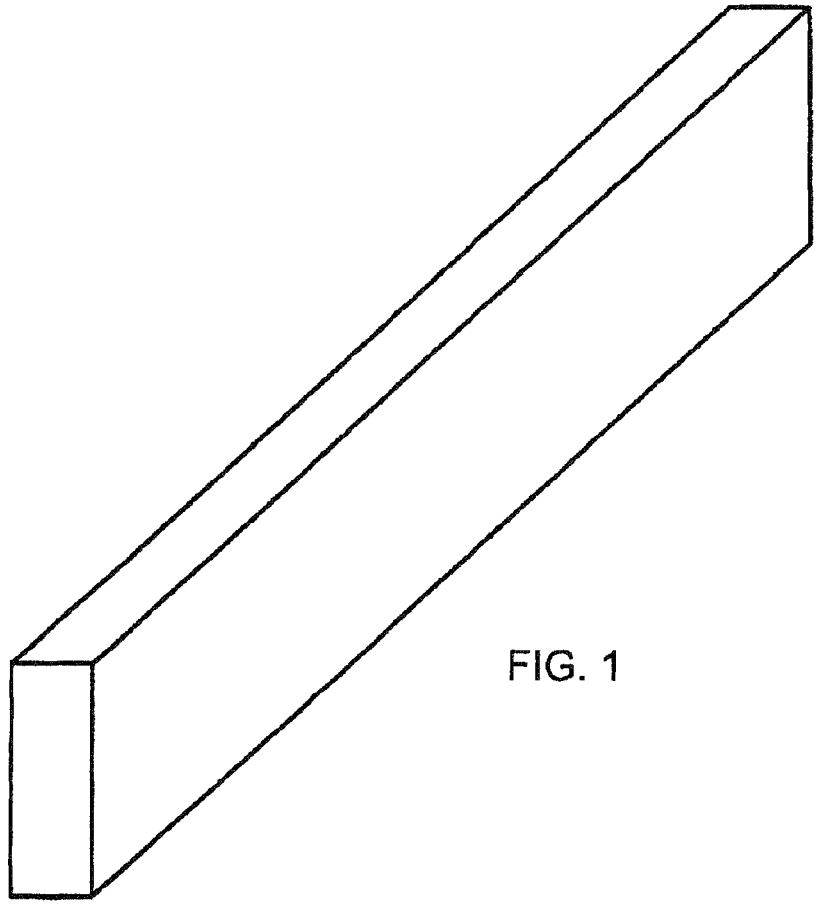
FIG. 1 is a perspective view of a timber cross arm as known in the prior art.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In this specification the terms "comprise, comprises, comprised and comprising" and the terms "include, includes, included and including" are deemed to be totally interchangeable and should be afforded the widest possible Interpretation.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In this specification the terms "comprise, comprises, comprised and comprising" and the terms "include, includes, included and including" are deemed to be totally interchangeable and should be afforded the widest possible Interpretation.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. section 1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

Figure 3:
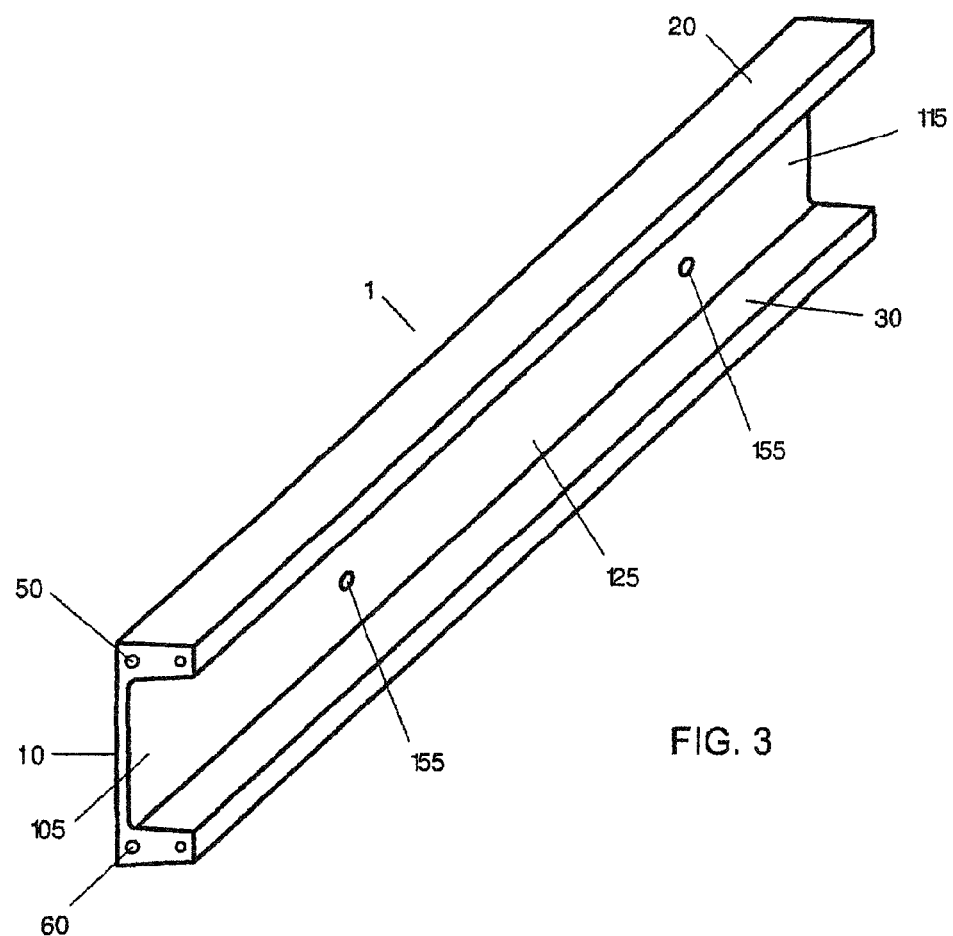
FIG. 3 is a perspective view of a cementitious composite cross arm according to the invention

Recent improvements to concrete, including the use of organic or metal fibres have provided a concrete composite that offers advantages when used to form cross arms. Such fibres and composites are disclosed in U.S. Pat. Nos. 6,478,867; 6,881,256; and 6,723,162, each of which are hereby incorporated by reference in their entirety. The concrete compositions used in cross arm 1, as seen in FIG. 3, include a hardened cement matrix in which organic or metal fibres are dispersed, which can be obtained by blending with water, a composition also containing cement; granular elements (having a maximum grain size (D) of 2 mm); fine elements with a pozzolanic reaction (having a particle size of no more than 20 μm); and a dispersing agent. The weight percentage of water to the weight of the cement and fine pozzolanic elements is between 8% and 25%. The organic fibres have a minimum individual length (I) of 2 mm and an I/Φ ratio of at least 20, Φ being the fibre diameter. The volume of fibre represents no more than 8% of the concrete volume, and the ratio between the average fibre length and the maximum grain size D is at least 5.

An alternative concrete composition includes a hardened cement matrix in which organic fibres are dispersed, which is obtained by blending with water, a composition also containing cement; granular elements; fine elements with a pozzolanic reaction (having a particle size of no more than 1 μm); and a dispersing agent. The weight percentage of water to the weight of the cement and fine pozzolanic elements is between 8% and 24%. The organic fibres have a minimum individual length (I) of 2 mm and an I/Φ ratio of at least 20, Φ being the fibre diameter. The volume of fibre represents no more than 8% of the concrete volume. The cement, granular elements and fine elements have a grain size D75 of at most 2 mm, and a grain size D50 of at most 150 μm. The ratio between the average fibre length and the grain size D75 is at least 5.

Yet another alternative concrete composition includes a hardened cementitious matrix including cement; aggregate particles having a particle size (Dmax) of no more than 2 mm; pozzolanic-reaction particles having an elementary particle size of no more than 1 μm; constituents capable of improving the toughness of the matrix selected from the group consisting of acicular and flaky particles, wherein the particles have an average size of at most 1 mm and which are present in a proportion by volume of between 2.5 and 35% of the combined volume of the aggregate particles and of the pozzolanic-reaction particles; at least one dispersing agent; metal fibres dispersed in the hardened cementitious matrix, wherein the fibres have an individual length (l) of at least 2 mm and an l/d ratio of at least 20, d being the diameter of the fibres, the Ratio® of the average length (L) of the fibres to the maximum particle size (Dmax) of the aggregate particles is at least 10 and the amount of fibres is such that their volume is less than 4% of the volume of the concrete after it has set; and water, wherein the percentage by weight of water W with respect to the combined weight of the cement and of the particles is in the range 8-24%.

A further alternative concrete composition includes a hardened cementitious matrix including cement; aggregate particles; pozzolanic-reaction particles having an elementary particle size of at most 1 μm; constituents capable of improving the toughness of the matrix selected from the group consisting of acicular and flaky particles, wherein the particles have an average size of at most 1 mm and are present in a proportion by volume of between 2.5 and 35% of the combined volume of the aggregate particles and of the pozzolanic-reaction particles; and at least one dispersing agent, wherein the combination of the cement, aggregate particles, pozzolanic-reaction particles and constituents has a D75 particle size of at most 2 mm and a D50 particle size of at most 200 μm; metal fibres dispersed in the hardened cementitious matrix, wherein the fibres have an individual length l of at least 2 mm and an l/d ratio of at least 20, d being the diameter of the fibres, and the ratio (R) of the average length (L) of the fibres to the D75 particle size of the combination of the cement, aggregate particles, pozzolanic-reaction particles and constituents is at least 5, and the amount of fibres is such that their volume is less than 4% of the volume of the concrete after it has set; and water, wherein the percentage by weight of water W with respect to the combined weight of the cement and of the pozzolanic-reaction particles is in the range 8-24%.

Another alternative concrete composition includes a hardened cementitious matrix in which metal fibres are dispersed and represent a volume (V1) of the concrete after setting, which is obtained by mixing, with water, a composition which includes, apart from the metal fibres: cement; aggregate particles having a particle size D90 of at most 10 mm; pozzolanic-reaction particles having an elementary size ranging between 0.1 and 100 μm; at least one dispersing agent; and satisfying the following conditions: (1) the percentage by weight of water with respect to the combined weight of the cement and of the pozzolanic-reaction particles lies within the 8-24% range; (2) the metal fibres have an average length $l_1$ of at least 2 mm and an $l_1/Ø_1$ ratio of at least 20, $Ø_1$ being the diameter of the fibres; (3) a ratio, $V_1/V$, of the volume $V_1$ of the metal fibres to the volume V of the organic fibres is greater than 1, and a ratio, $l_1/l$, of the length of the metal fibres to the length of the organic fibres is greater than 1; (4) a ratio R of the average length $l_1$ of the metal fibres to the size $D_{90}$ of the aggregate particles is at least 3; and (5) the amount of metal fibres is such that their volume is less than 4% of the volume of the concrete after setting. The above is improved by adding to the concrete, organic fibres having a melting point of less than 300° C., an average length l of greater than 1 mm and a diameter Ø of at most 200 μm; the amount of organic fibres being such that their volume V ranges between 0.1 and 3% of the volume of the concrete after setting; the concrete having a characteristic 28-day compressive strength of at least 120 MPa, a flexural strength of at least 20 MPa, and a spread value in the unhardened state of at least 150 mm; the compressive strength, flexural strength and spread value being given for a concrete stored and maintained at 20° C.

Yet another alternative concrete composition is a fire-resistant ultrahigh-performance concrete having a 28-day compressive strength of at least 120 MPa, a flexural strength of at least 20 MPa, and a spread value in the unhardened state of at least 150 mm; the compressive strength, the flexural strength, and the spread value being given for a concrete stored and maintained at 20° C.; the concrete including a hardened cementitious matrix in which metal fibres are dispersed and represent a volume $V_1$ of the concrete after setting, which is obtained by mixing, with water, a composition which includes, apart from the metal fibres: cement; aggregate particles having a particle size $D_{90}$ of at most 10 mm; pozzolanic-reaction particles having an elementary size ranging between 0.1 and 100 µm; at least one dispersing agent; organic fibres having a volume V; and satisfying the following conditions: (1) the percentage by weight of water with respect to the combined weight of the cement and of the pozzolanic-reaction particles lies within the 8-24% range; (2) the metal fibres have an average length $l_1$ of at least 2 mm and an $l_1/\emptyset_1$ ratio of at least 20, $\emptyset_1$ being the diameter of the fibres; (3) the organic fibres have a melting point of less than 200° C., an average length l of greater than 1 mm, and a diameter Ø of at most 200 µm; (4) a ratio, $V_1/V$, of the volume $V_1$ of the metal fibres to the volume V of the organic fibres is greater than 1, and a ratio, $l_1/l$, of the length $l_1$ of the metal fibres to the length l of the organic fibres is greater than 1; (5) a ratio R of the average length $l_1$ of the metal fibres to the size $D_{90}$ of the aggregate particles is at least 3; (6) the amount of metal fibres is such that their volume is less than 4% of the volume of the concrete after setting; and (7) the amount of organic fibres is such that their volume ranges between 0.1 and 3% of the volume of the concrete after setting.

The above concrete compositions are herein each referred to as "cementitious composites" and are available from Lafarge North America under the trade-mark DUCTAL.

The use of cementitious composites provide a cross arm 1 that is not combustible and is environmentally benign (i.e. it has no negative impact on the local environment). Cross arm 1 has a long life expectancy, of at least 75 years, and therefore a lower life cycle cost when compared to timber or steel, given the cost of replacement. Cross arm 1 can be installed using installation equipment and methods commonly used with timber cross arms. Cross arm 1 is electrically non conductive, and can resist harsh weather conditions, for example, cross arm 1 is freeze and thaw resistant, ultra violet light resistant, corrosion resistant, and does not rot or decompose.

Cross arm 1 also provides several advantages when compared to concrete. Cementitious composites do not have capillarity porosity. The fibres cause the cementitious composite to provide ductility to cross arm 1, and allow deflection without fracture.

Another feature of cross arm 1 is that it self heals small cracks as the fibres engage the cracks and unhydrated cementitious particles react with air and moisture to further increase the mechanical strength of the material. Moreover, in an extreme overload condition, large visible cracks allow for an efficient visual inspection of cross arm 1, including the potential for a future structural problem. In the same manner, ductility in cross arm 1 allows for deformations and cracks without structural failure, hence providing an opportunity for effective replacement.

Cross arm 1 fits into the existing electrical grid. Internal storage of cross arm 1 is not required, and it can be stored externally. Cross arm 1 may colored as the user selects, and may be colored to match the colour of the utility pole (e.g. a color close to wood) to which they are attached, or the environment in which they are placed, which may be preferable for marketing and public acceptance reasons. Dirt and other contaminants on cross arms can be a source of electrical conductivity. The cross section and surface of cross arm 1 are designed to provide self cleaning benefits using rain.

Given the ease of storage, cross arms 1 can be purchased and maintained in bulk. Replaced cross arms 1 can be crushed and then recycled and used as a road base or other construction. Also, industrial by-products are used in the making of cross arm 1.

Installation, repair or replacement of cross arm 1 can be done on an energized electrical line, as cross arm 1 is not conductive. Cross arm 1 will not risk electrical interference causing partial discharges and is more able to withstand a lightning strike. Also as the cementitious composite is not combustible, it will not propagate fire in forest fires. For this reason, the risk from vandalism and fire is minimal. Cross arm 1 will have a weight similar to or less than a steel cross arm yet has the significant advantage of non-conductivity.

Figure 6:
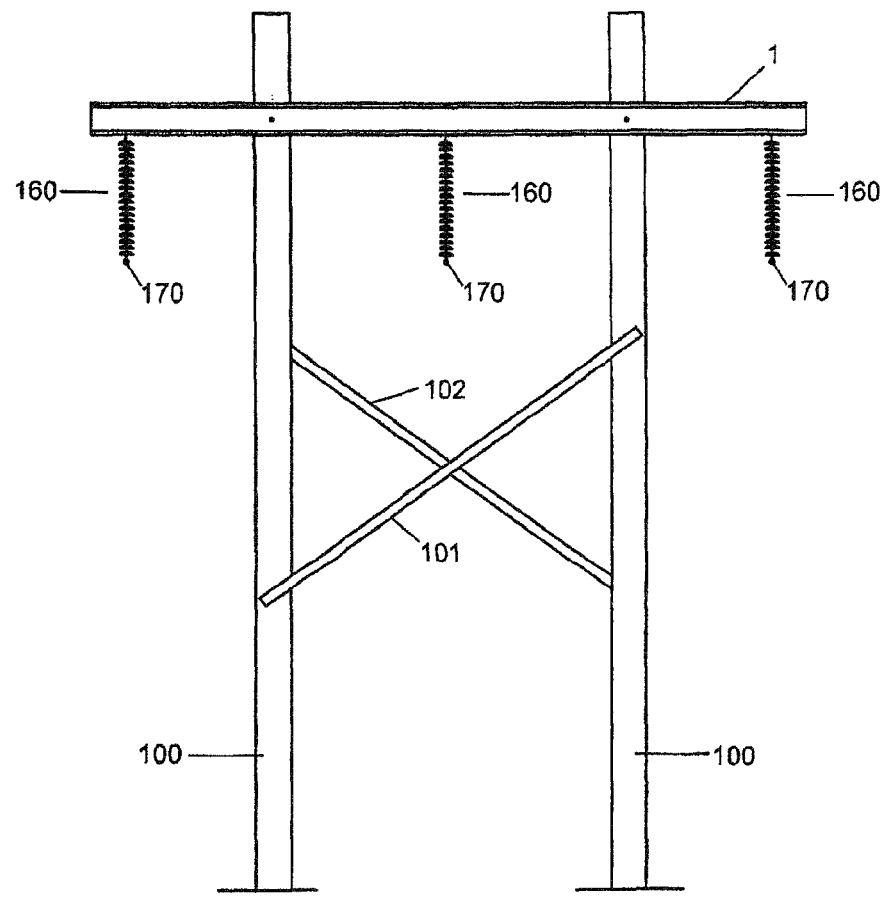
FIG. 6 is a front view of cross arms in place in place on two utility poles.
Figure 6B:
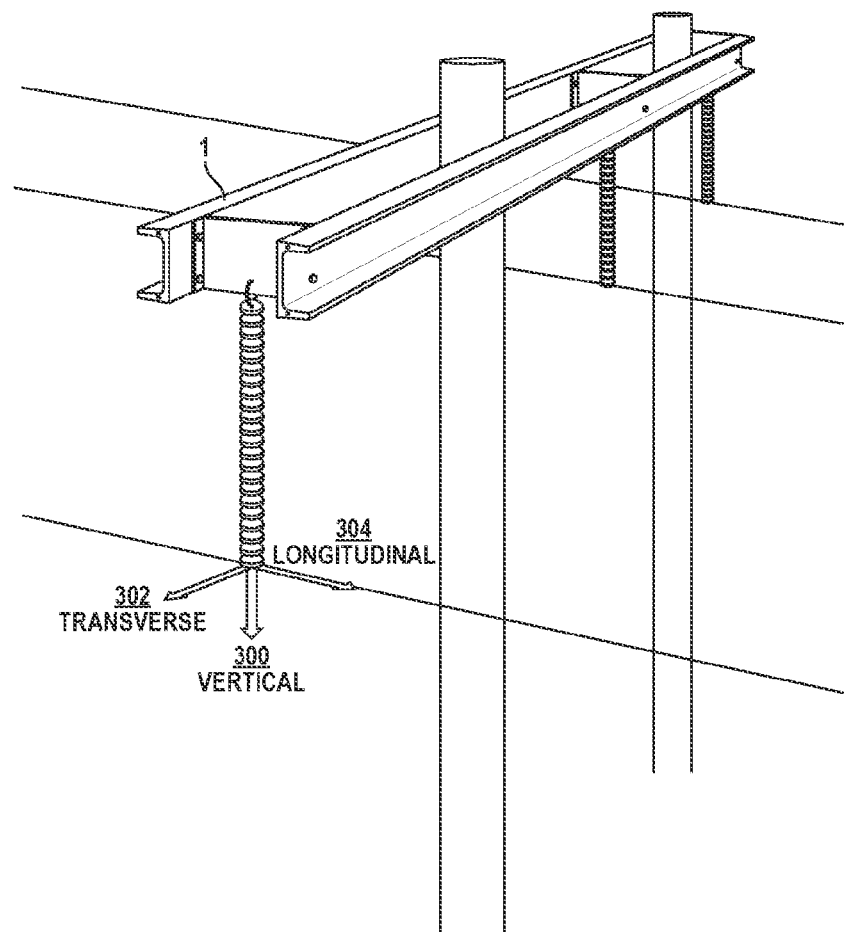
FIG. 6B is a perspective view of a cross arm place on two utility poles and illustrating three load types.
Figure 7:
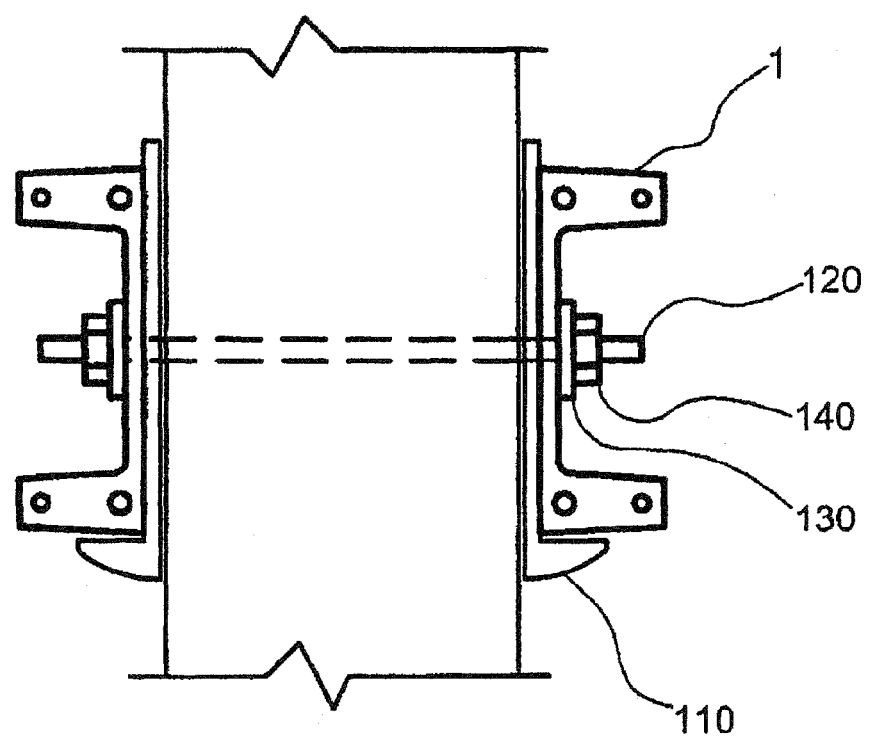
FIG. 7 is a side view of a portion thereof, showing two cross arms secured to a utility pole.

The function of cross arm 1 is to support conductors in the air within a frame, such as an "H frame", i.e. supported by two utility poles 100, as seen in FIG. 6. Moreover, cross arm 1 of the present invention is designed to carry vertical 300, transverse 302 and longitudinal 304 loads, as seen in FIG. 6b. H frames may be further supported by cross braces 101, 102, placed on opposite sides of utility poles 100. Cross arms 1 are attached to a utility poles 100 by a galvanized steel threaded rods 120, as seen in FIG. 7, passing through cross arms 1 and utility pole 100. Typically two cross arms 1 are mounted back to back on opposite sides of utility poles 100. A bracket 110 may be in place between cross arm 1 and pole 100 to help support cross arms 1. Threaded rods 120 extend through cross arm 1 through aperture 155 and through both sides of pole 100, and are held in place with washer 130 and nut 140.

Figure 8:
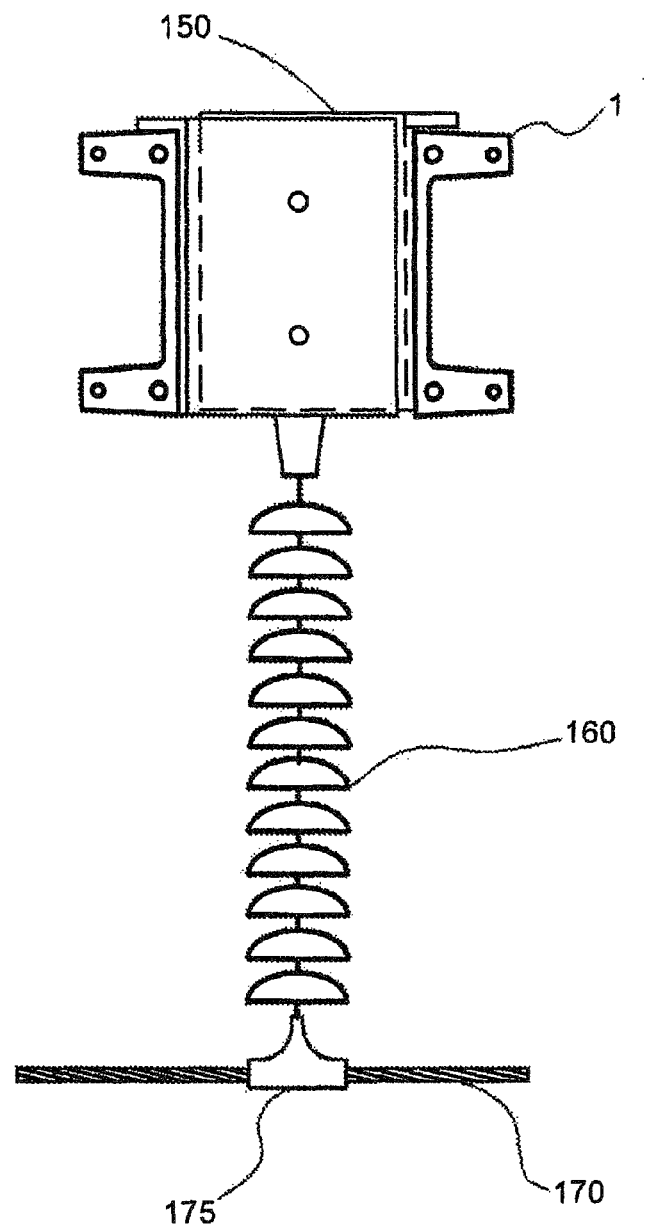
FIG. 8 is a cross sectional view showing how the cross arm supports a conductor.

As seen in FIG. 8, cross arms 1 holds conductors 170 by hardware component 150 which has flanges on both sides allowing hardware component 150 to be supported by both cross arms 1. Insulator 160 hangs from hardware component 150, and conductor 170 is held below insulator 160 by clamp 175.

Figure 2:
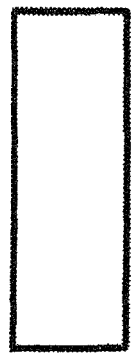
FIG. 2 is a cross sectional view thereof.
Figure 5:
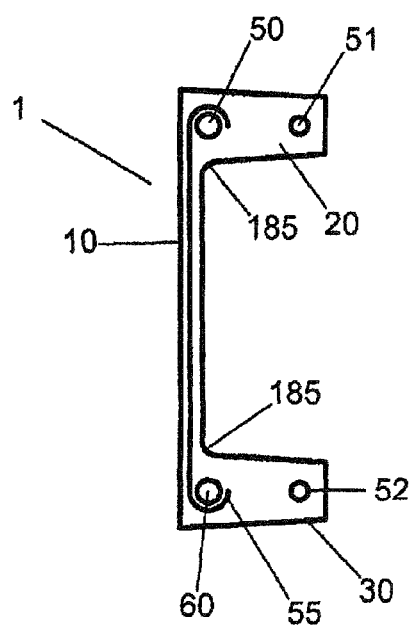
FIG. 5 is a cross sectional view of an alternative embodiment of a cross arm.

As seen in FIGS. 1 and 2, cross arms in the prior art are solid with a rectangular cross section, or may have a solid rectangular exterior with a hollow interior. Cross arm 1, made of cementitious composite, need not have a rectangular cross section. As the cementitious composite is stronger than timber, a rough "C" cross section shape, as seen in FIGS. 3 and 5, may be used wherein rectangular back member 10 is positionable adjacent to utility pole 100. Conductors 170 are typically supported at approximately either end 105, 115 of cross arm 1 and at middle 125. Top and bottom extensions 20, 30, which extend along the length of cross arm 1, provide additional strength.

Figure 4:
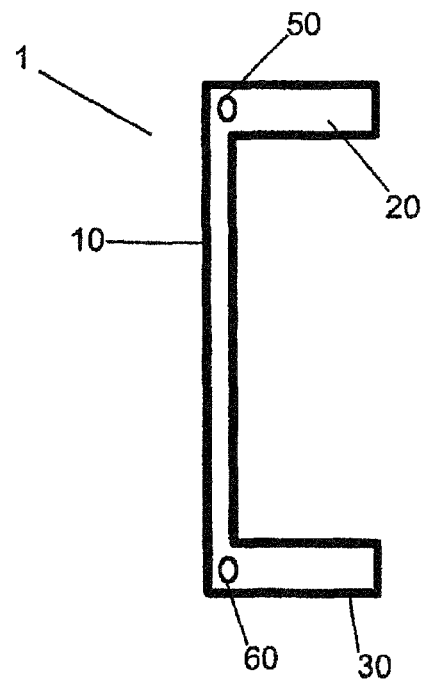
FIG. 4 is a cross sectional view of a cross arm.

Top extension 20 may extend from a top edge of back member 10. Likewise, bottom extension 30 may extend from a bottom edge of back member 10. Top and bottom extensions 20, 30 may extend generally perpendicularly from back member 10. Top and bottom extensions 20, 30 may have curved interior flanges 185 as seen in FIG. 5. FIG. 4 shows an embodiment of cross arm 1 wherein curved flanges 185 are not present.

In addition, metal or glass fibre reinforced polymer bars 50, 60, as seen in FIGS. 4 and 5, may be placed within cross arm 1 along the longitudinal axis of cross bar 1, which allows for additional reinforcement, thereby increasing the bending capacity under vertical, transverse and longitudinal loads, typical of high voltage transmission lines. Bars 50, 60, if made of a conductive material, may be electrically connected by a number of embedded wires 55 to eliminate voltage differential between the bars to prevent electrical interference. If bars 50, 60 are made of glass reinforced polymer, two additional bars 51, 52, as seen in FIG. 5, may also be used.

In an embodiment of the invention, extensions 20, 30 will extend about 10 cm from the near edge of back member 10 and each have about 1 cm of height at the farthest point from back member 10. Back member 10 may be about 30 cm high. Cross arm 1 may have a length of about 30 m, but may be of any length appropriate. Cross arm 1 may, in fact, have a wide variety of sizes, for example the length of extension 20, 30 may preferably range from 5 cm to 25 cm. Likewise the height of back member may be from 15 cm to 54 cm. The height of extensions 30, 40 may range from 1 to 4 cm, and in the flanged embodiment shown in FIG. 5, extensions 20, 30 may angle inward 2 mm to 5 mm.

Figure 9:
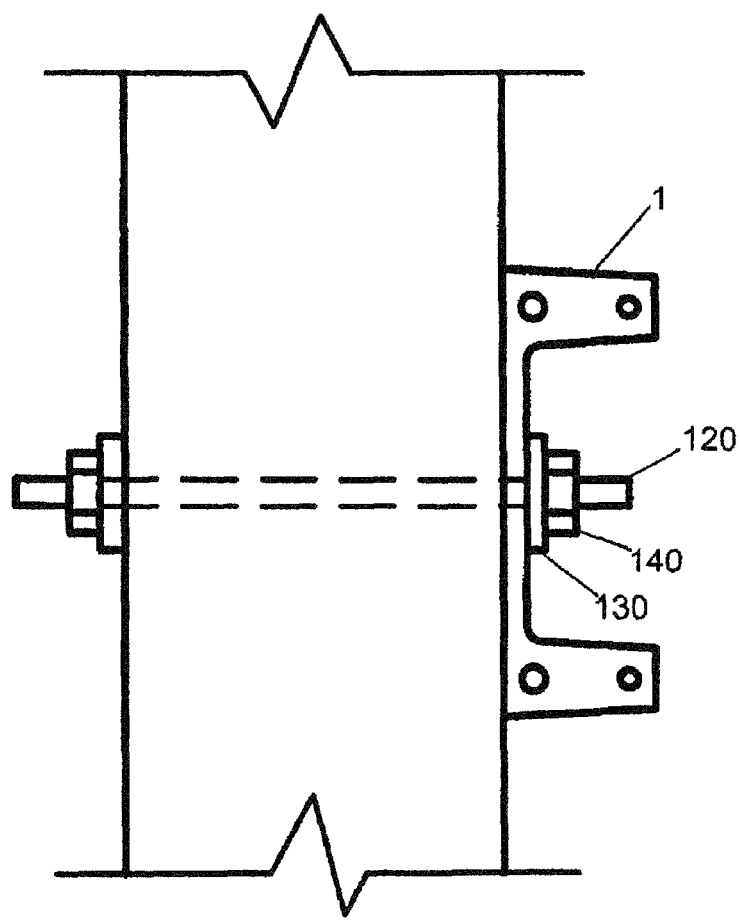
FIG. 9 is a cross sectional view of single cross arm attached to a pole.
Figure 10:
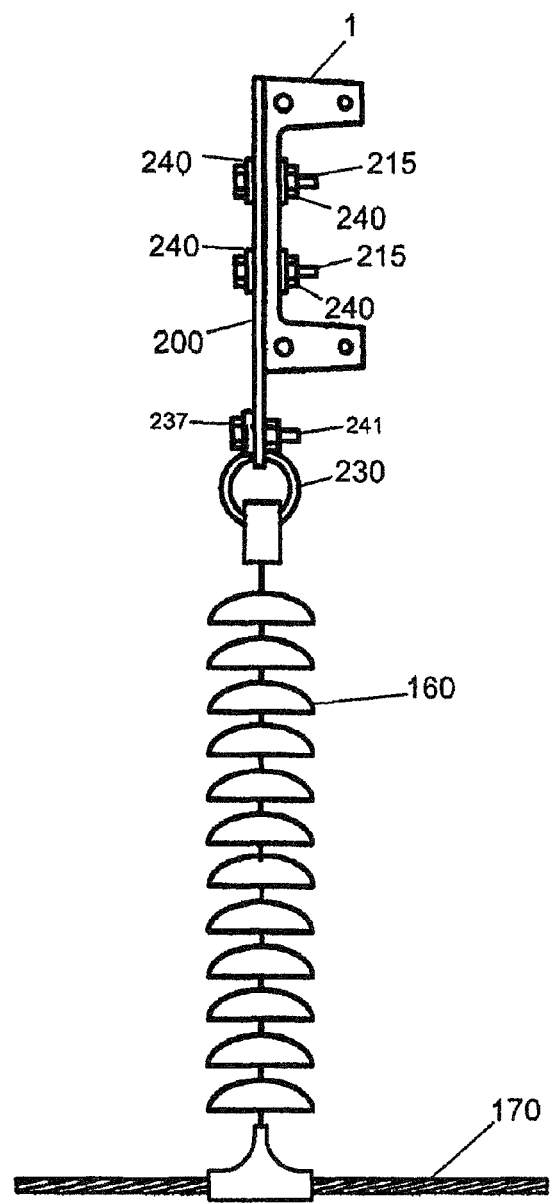
FIG. 10 is a cross sectional view of a single cross arm supporting a conductor.

In an alternative embodiment, as seen in FIGS. 9 and 10, a single cross arm 1 could be attached to two utility poles 100. In this embodiment, a plate 200, secured to cross arm 1 using two bolt 215 and nut 220 combinations, can be used to hold insulator 160. At the bottom of plate 200 is a u-ring 230 held in place by bolt 241 and nuts 237. A single cross arm 1 is secured to a utility pole 100 in a manner similar to that in the case of two cross arms 1, as shown in FIG. 7.

Cross arm 1 should be precast due to complex production processes (e.g. forming, batching, casting, stripping and curing). Cross arm 1 can be manufactured industrially in a controlled environment so that weather conditions do not influence the availability of cross arm 1. Cross arm 1 is easily shipped and can be manufactured in large volumes, with minimal environmental impact (particularly in comparison to timber). Installation holes may be pre drilled before delivery. Depending on the voltage level on the transmission lines, cross arm 1 may be made of any appropriate length.

Figure 12:
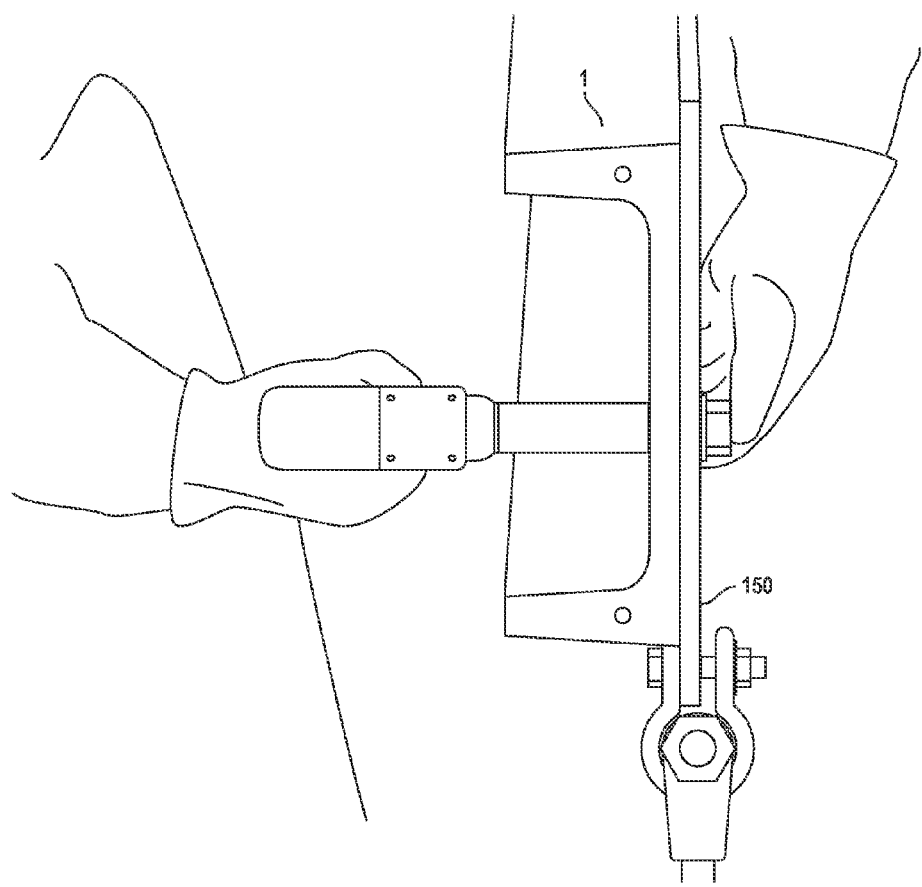
FIG. 12 is a photograph of an arm and hardware component.

FIGS. 11A, 11B, 11C and 11D illustrate a preferred arm optimization, wherein the size of flange 185 is increased. FIG. 12 is a photograph of arm 1 and hardware component 150 (during an installation step) from which an insulator will hang.

Figure 13:
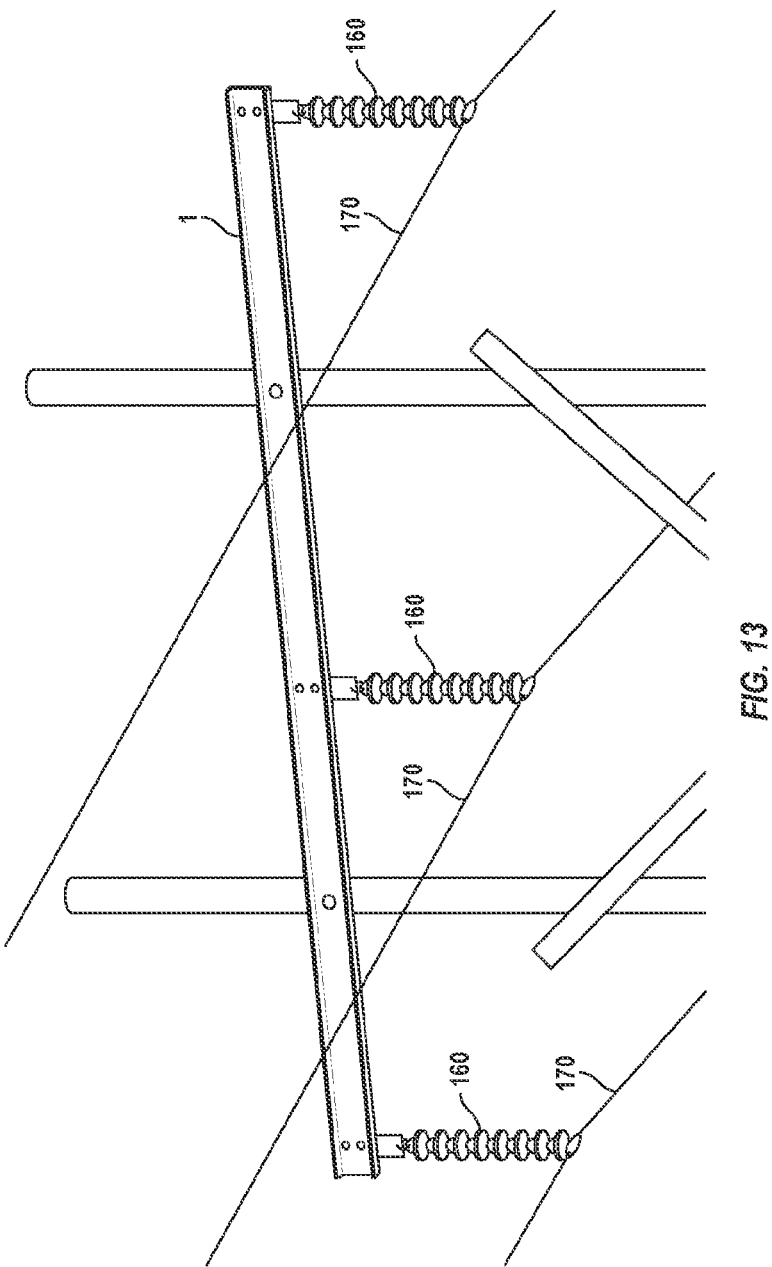
FIG. 13 is a photograph of cross arms in place in place on two utility poles.
Figure 14:
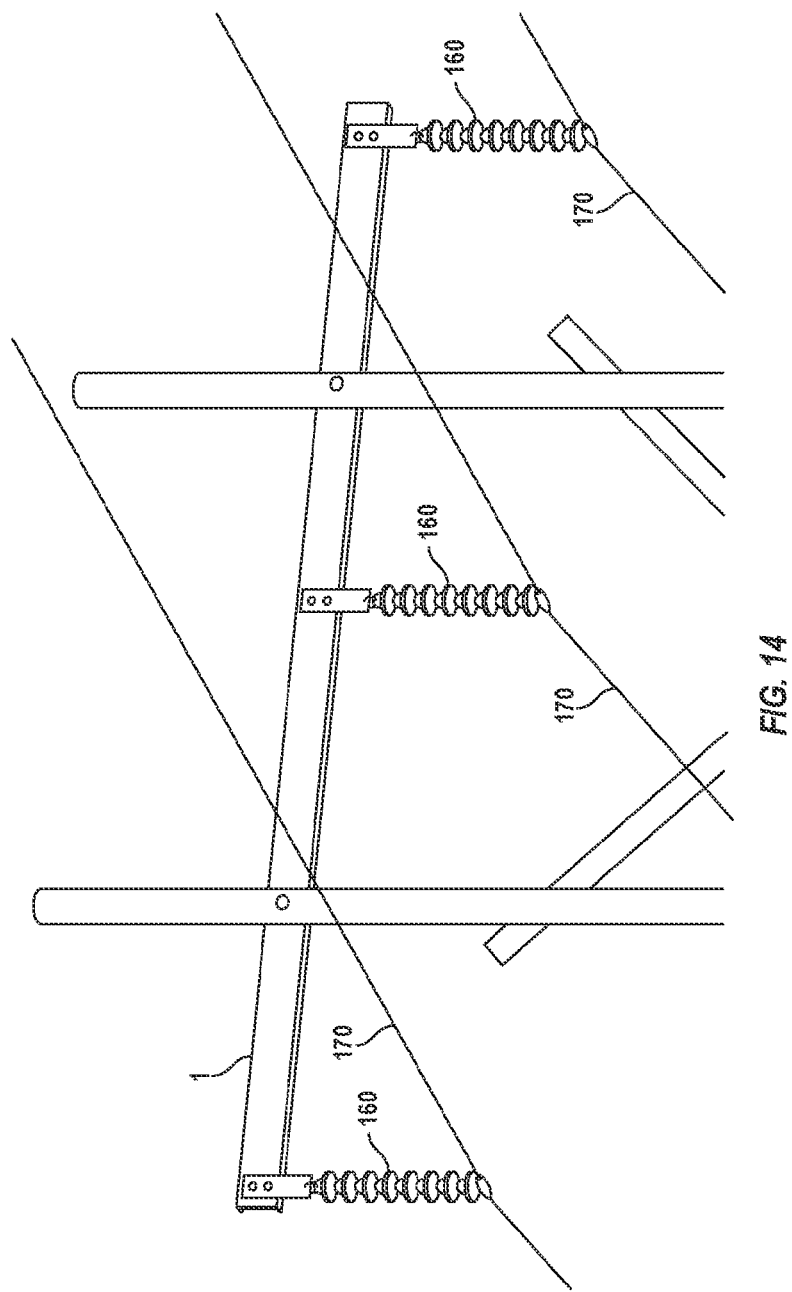
FIG. 14 is a photograph of a back view of cross arm 1 in place in place on two utility poles.
Figure 15:
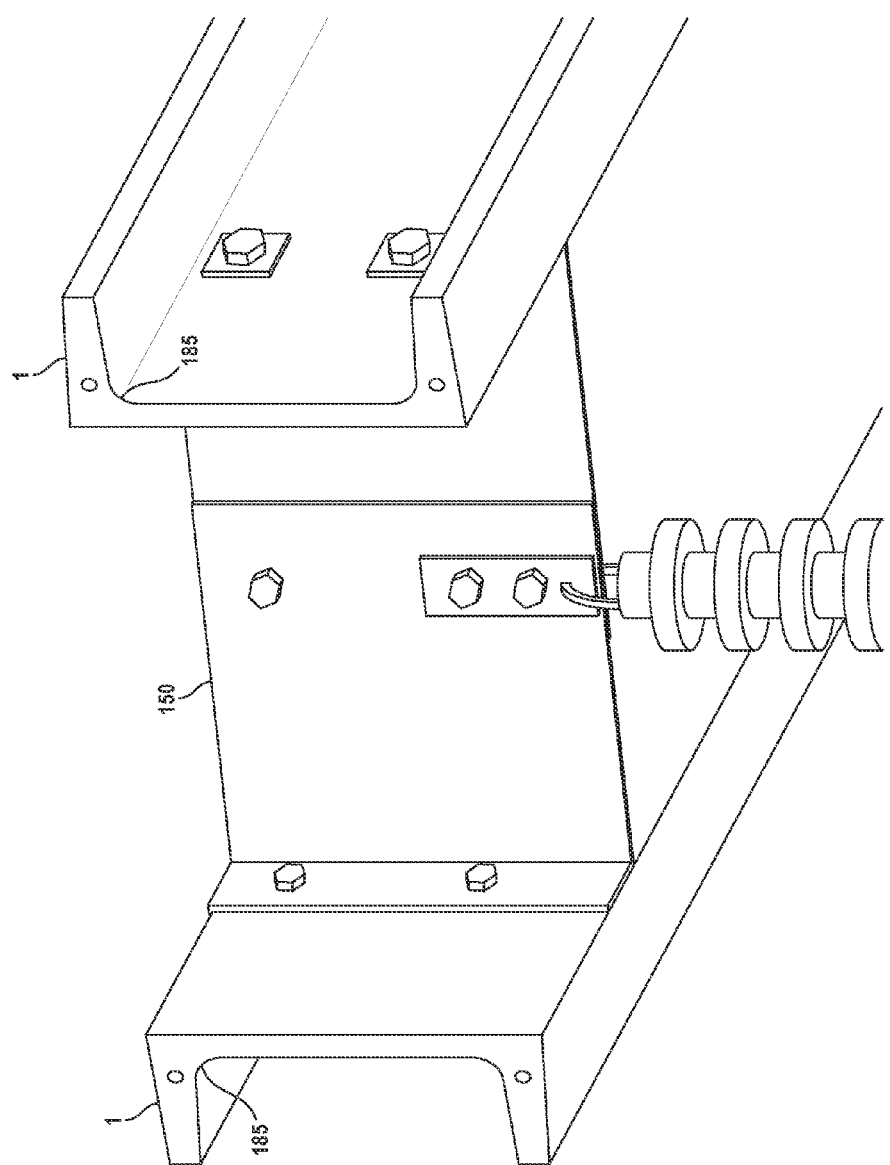
FIG. 15 is a perspective view of the co join of two arms, hardware component and hanging insulator.

FIG. 13 is a photograph of a front view of cross arm 1 in place in place on two utility poles, showing insulators 160 and conductor 170. FIG. 13 is a photograph of a back view of cross arm 1 in place in place on two utility poles, showing insulators 160 and conductor 170. FIG. 15 is a perspective view of the co join of two arms 1, hardware component 150 and hanging insulator 160. This illustration further shows curved interior flanges 185, such flanges being adjustable in size and adaptable to particular in situ environmental conditions in which arm may be placed.

One of the key features of the cross arm of the present invention is its ability to carry varying type of loads. Vertical loads on an arm include the weight of the arm itself and weight of conductors. Conductors and cables are subjected to ice loads by direct accumulation on them. Transverse loads are caused either by wind pressure acting on conductors or cables or for angle structures from non-aligned tension loads. When ice is accumulated on the conductors or cables, the projected area of the conductor is larger, which increases wind loads. Longitudinal loads are due to unequal horizontal tensions on either side of the supporting arm. Such loads include those created by differential icing, angle line loads and installation load. Generally, the tension loads in a cross arm occur when there is a change of direction in the line. The tension in the cables can cause significant transverse loads on the cross arms.

The crossarm at the support is therefore subjected to the following bending moments:

Bending moment due to weight span of conductor, this may be either positive or negative, depending upon whether the profile imposes a down pull or an uplift of the conductors.

Bending moment due to transverse conductor loads—wind and deviation loads acting at top of insulator pin Bending moment due to direct horizontal pull of conductors (termination or strain structure only).

Maintenance loads resulting from additional conductor lowering or anchoring activities and loads due to pole top rescue.

The self weight of the crossarm

The design of the cross arm of the present invention allows for support across these three load types and furthermore its design may be customized to particular in sity environmental (for example weather) conditions. Such adjustment is preferably made by way the flange width (narrower or wider, as desired). There is no teaching of such adaptation or customization in prior known arms.

EXPERIMENTAL

The following experiments are provided for illustration purposes only and are not intended to limit the scope of the present invention in any way.

Example 1

Testing of Cross Arms

Partial Discharge Test
Objective:
Determine if material exhibits damaging internal electrical discharges when exposed to electrical fields of typical transmission lines. Two tests: Un-bonded & bonded.
Result:
Un-bonded: better insulating levels than wood. Bonded: Better insulating levels than steel.
AC Flashover Test
Objective:
Determine how well the material can withstand 60 Hz flashover (cross arm exposure to abnormal operating conditions)
Result
More stable than wood or steel. No damage.
Lightning Impulses Test
Objective:
Determine if the material can endure steep front, high energy electrical impulses typical of lightning strikes on transmission lines.
Result:
Cross arm test with voltages up to 1.6 MV surface damage. Timer: pieces of wood blown apart.
Modified AC and Lightning Impulse Breakdown Test
Objective:
Determine relative insulating properties of this new composite material relative to traditional wood
Result:
Twice as better insulating properties than wood.
Cross arm sample: 2 kV (AC); 25 kV (impulse). Insulating improvements from previous cross arms using steel reinforcements
Wood sample same thickness as Cross arm: 4 kV (AC); 12 kV (impulse)
Steel: absolutely no insulating properties.
Tracking Wheel Test
Objective:
Determine how well the material surface will stand up to long exposure to leakage currents.
Result:
Cross Arm sample: No damage under accelerated tests. Meaning more stable than wood or FRP. Galvanized coating on steel severely damaged.

In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

Further, in the methods taught herein, the various acts may be performed in a different order than that illustrated and described. Additionally, the methods can omit some acts, and/or employ additional acts. As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

While certain aspects of the invention are presented below in certain claim forms, the inventors contemplate the various aspects of the invention in any available claim form

We claim:

1. A cross arm, comprising:
a) a back member having a top edge and a bottom edge;
b) a top member extending from said top edge;
c) a bottom member extending from said bottom edge; and
wherein said cross arm is composed of a cementitious composite and wherein such members and cementitious composite composition allow the arm to support vertical, transverse and longitudinal loads, and wherein the top member and bottom member are integral with the back member and comprise curved flanges, said flanges being adjustable in size.

2. The cross arm of claim 1 wherein said top member and said bottom member extend generally perpendicular to said back member.

3. The cross arm of claim 2 wherein said back member has a generally flat back portion.

4. The cross arm of claim 3 wherein said cross arm further comprises a metal bar extending along a length of said cross arm.

5. The cross arm of claim 4 wherein said cross arm further comprises a second metal bar extending along a length of said cross arm.

6. The cross arm of claim 5 wherein said cross arm is attachable to a utility pole.

7. The cross arm of claim 6 wherein said cross arm supports a conductor.

8. The cross arm of claim 7 wherein a second cross arm composed of said cementitious composite is positioned on an opposite side of said utility pole parallel to said first cross arm.

9. The cross arm of claim 3 wherein said cross arm further comprises four glass fibre reinforced polymer bars positioned on the longitudinal axis of said cross arm within said cross arm.

10. The cross arm of claim 1 wherein the top member, bottom member and back member together form a substantially C-shaped structure, in cross-section.

11. The cross arm of claim 1 wherein the top member and bottom member are integral with the back member and comprise curved flanges.

* * * * *